US011017663B2

(12) United States Patent
Tsumori et al.

(10) Patent No.: US 11,017,663 B2
(45) Date of Patent: May 25, 2021

(54) ULTRA-LOW-POWER TRAFFIC-MONITORING SYSTEM

(71) Applicant: Murata Manufacturing Co., Ltd., Nagaokakyo (JP)

(72) Inventors: Hiroaki Tsumori, Nagaokakyo (JP); Go Yuasa, Torrance, CA (US)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/733,008

(22) PCT Filed: Oct. 2, 2017

(86) PCT No.: PCT/US2017/054716
§ 371 (c)(1),
(2) Date: Apr. 2, 2019

(87) PCT Pub. No.: WO2018/067436
PCT Pub. Date: Apr. 12, 2018

(65) Prior Publication Data
US 2020/0035091 A1    Jan. 30, 2020

Related U.S. Application Data

(60) Provisional application No. 62/403,567, filed on Oct. 3, 2016.

(51) Int. Cl.
*G08G 1/00* (2006.01)
*G08G 1/01* (2006.01)
(Continued)

(52) U.S. Cl.
CPC ............ *G08G 1/0116* (2013.01); *G08G 1/00* (2013.01); *G08G 1/0133* (2013.01);
(Continued)

(58) Field of Classification Search
CPC ............ G08G 1/015; G08G 1/04; G08G 1/00; G08G 1/07; G08G 1/0116; G08G 1/052; G08G 1/056; G08G 1/0175
See application file for complete search history.

(56) References Cited

U.S. PATENT DOCUMENTS 6,466,862 B1 * 10/2002 DeKock ............... G08G 1/0104
340/901
6,633,238 B2   10/2003 Lemelson et al.
(Continued)

OTHER PUBLICATIONS

Official Communication issued in International Patent Application No. PCT/US2017/054716, dated Dec. 18, 2017.

*Primary Examiner* — Benyam Haile
(74) *Attorney, Agent, or Firm* — Keating & Bennett, LLP

(57) ABSTRACT

A traffic-monitoring system includes a gateway that includes a gateway radio and that is connected to a server and traffic-monitoring devices arranged along a road. Each of the traffic-monitoring devices includes a housing, a microcontroller that is located within the housing, at least one sensor that is located within the housing, that is connected to the microcontroller, and that collects traffic and/or environmental data, and a monitor radio that sends data to the gateway or an adjacent traffic-monitoring device. The microcontroller processes data collected by the at least one sensor to reduce an amount of data to be sent to the gateway or the adjacent traffic-control device and sends processed data to the gateway or the adjacent traffic-monitoring device in real time or near real time using the monitor radio.

16 Claims, 6 Drawing Sheets

(51) Int. Cl.
*G08G 1/04* (2006.01)
*H02J 7/35* (2006.01)
*H04W 88/16* (2009.01)

(52) U.S. Cl.
CPC ............ *G08G 1/0141* (2013.01); *G08G 1/04* (2013.01); *H02J 7/35* (2013.01); *H04W 88/16* (2013.01)

(56) References Cited

U.S. PATENT DOCUMENTS

| | | |
|---|---|---|
| 7,558,695 B2 | 7/2009 | Calderone et al. |
| 7,930,095 B2 | 4/2011 | Lee |
| 9,000,946 B2 | 4/2015 | Finlay |
| 9,014,953 B2 | 4/2015 | Breed et al. |
| 9,235,988 B2 | 1/2016 | Mimeault et al. |
| 9,245,444 B2 | 1/2016 | Finlay |
| 9,361,799 B2 | 6/2016 | Finlay |
| 2007/0208494 A1* | 9/2007 | Chapman ............. G08G 1/0104 701/117 |
| 2008/0238720 A1* | 10/2008 | Lee ........................ G08G 1/081 340/909 |
| 2010/0179748 A1 | 7/2010 | Choi et al. |
| 2010/0321209 A1 | 12/2010 | Etchegoyen |
| 2011/0121654 A1* | 5/2011 | Recker .................. H02J 7/0068 307/66 |
| 2011/0254699 A1 | 10/2011 | Sugawara et al. |

* cited by examiner

ULTRA-LOW-POWER TRAFFIC-MONITORING SYSTEM

BACKGROUND OF THE INVENTION

1. Field of the Invention

The present invention relates to a traffic-monitoring system. More specifically, the present invention relates to an ultra-low-power traffic-monitoring system that is configurable with different sensors.

2. Description of the Related Art

Known traffic-monitoring systems use large amounts of data and energy by being wired. These wired systems cost a lot to operate and maintain. Known traffic-monitoring systems attempt to achieve a robust network and power system with a low cost, but these known traffic-monitoring systems cost too much to install, operate, and/or maintain.

SUMMARY OF THE INVENTION

To overcome the problems described above, preferred embodiments of the present invention provide a traffic-monitoring system and a traffic-monitoring device that has a low-power consumption and is easy to install and maintain.

According to a preferred embodiment of the present invention, a traffic-monitoring system includes a gateway that includes a gateway radio and that is connected to a server and traffic-monitoring devices arranged along a road. Each of the traffic-monitoring devices includes a housing, a microcontroller that is located within the housing, at least one sensor that is located within the housing, that is connected to the microcontroller, and that collects traffic and/or environmental data, and a monitor radio that sends data to the gateway or an adjacent traffic-monitoring device. The microcontroller processes data collected by the at least one sensor to reduce an amount of data to be sent to the gateway or the adjacent traffic-control device and sends processed data to the gateway or the adjacent traffic-monitoring device in real time or near real time using the monitor radio.

Preferably, the traffic and/or environmental data includes traffic data, and the traffic data includes data that is related to objects detected in a lane. Preferably, the traffic and/or environmental data includes traffic data; the lane is divided into lane segments; and the traffic data includes data that is related to objects detected in each of the lane segments. The microcontroller preferably determines which lane the objects pass through by determining a peak or centroid lane segment through which the objects pass. Preferably, the traffic and/or environmental data includes environmental data and traffic data, and the microcontroller samples the environmental data at a different rate than the traffic data and sends processed environmental data at different intervals than processed traffic data.

The at least one sensor preferably includes a camera and an active IR device. Each of the traffic-monitoring devices preferably includes a battery. The battery preferably includes a solar battery. Each of the traffic-monitoring devices preferably includes a solar panel that charges the battery. The battery preferably includes a Li-ion battery.

The processed data preferably includes one or more of a number of vehicles detected, a speed of each of the vehicles detected, a type of each of the vehicles detected, a direction of traffic flow, a presence of congestion, and an occurrence of an accident. Preferably, the traffic and/or environmental data includes traffic data, and the traffic data is sampled periodically, for example, every 30 seconds, and is sent periodically, for example, every minute. The gateway preferably sends data to at least one of the traffic-monitoring devices using the gateway radio.

According to a preferred embodiment of the present invention, a traffic-monitoring network includes a traffic-monitoring system according to one of the various preferred embodiments of the present invention and a data aggregator. The gateway sends data to the data aggregator via the server.

The traffic-monitoring network preferably sends aggregated data to consumers via a service provider.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Figure 1:
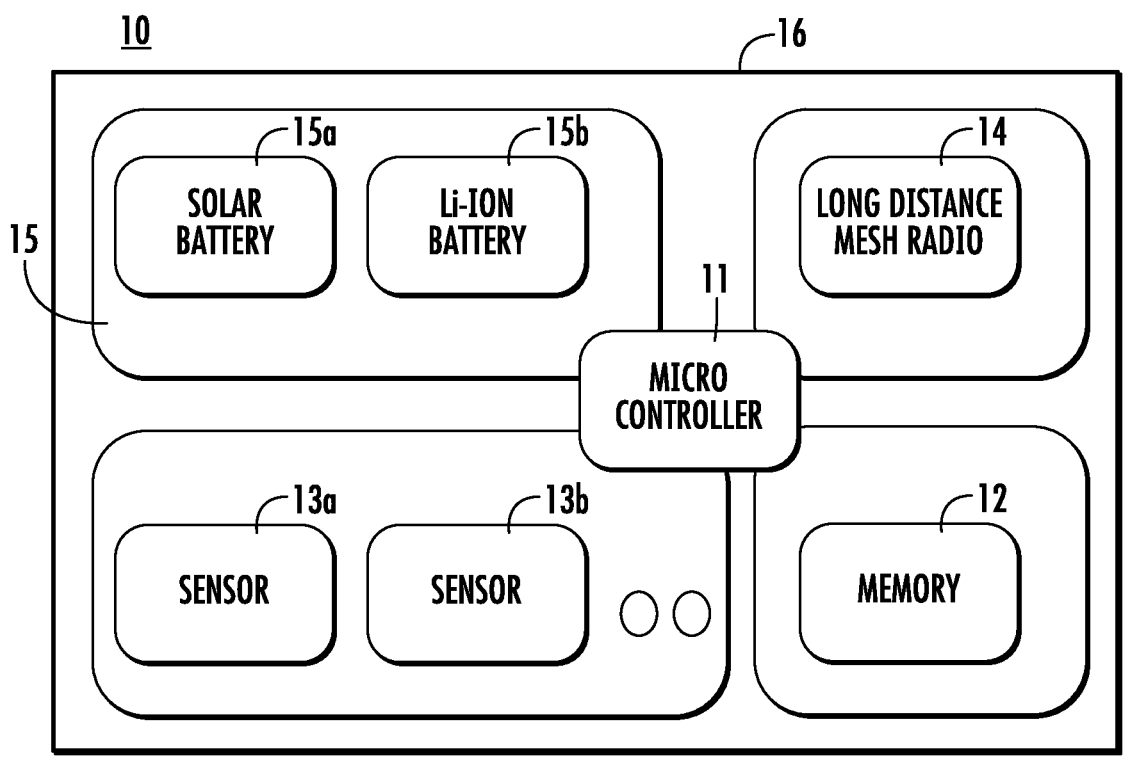
FIG. 1 is a schematic diagram of a traffic-monitoring device according to a preferred embodiment of the present invention.

FIG. 1 is a schematic diagram showing a traffic-monitoring device 10. The traffic-monitoring device 10 includes a microcontroller 11 connected to a memory 12, sensors 13a, 13b, . . . (reference number 13 refers to the sensors collectively), a radio 14, a battery 15, and a housing 16. Any suitable microcontroller 11 can be used. Any suitable memory 12 can used. The radio 14 can be a long-distance mesh radio, but other suitable radios can also be used. The battery 15 can include multiple batteries, including, for example, a solar battery 15a and a Li-ion battery 15b. If the traffic-monitoring device 10 includes a solar battery 15a, then the traffic-monitoring device 10 also includes solar cells (not shown in FIG. 1) to charge the battery 15. It is also possible to use AC current, including, for example, 100 V-240 V AC, to power the traffic-monitoring device 10. Using a battery 15 allows the traffic-monitoring device 10 to be easier to install.

The sensors 13 may include environmental sensors and traffic sensors, for example. The environmental sensors can sense, for example, temperature, air pollution, atmosphere, vibration, humidity, wind, location, etc. For example, the traffic-monitoring device 10 can sense road temperature, black ice, heavy rain, etc. The traffic sensors can include a camera and an active IR sensor. For example, the traffic-monitoring device 10 can sense the number, speed, and type of automobiles; direction of traffic flow; congestion; accident, etc. The traffic-monitoring device 10 can detect objects on each lane based on assigned segments, and the counted results for each lane (or lane segment) can be sent by the microcontroller 11 to a gateway 21, as shown, for example, in FIG. 2.

The sensors 13, including the traffic and environmental sensors, can collect data in real time. The microcontroller 11 can process the data to reduce the amount of data that is sent by the radio 14. Reducing the amount of sent data reduces the amount of power consumed by the traffic-monitoring device 10. The sent processed data allows for high-resolution (e.g., each lane) traffic information to be sent in real time or near real time, i.e., within one minute and with a sampling rate of 30 seconds. However, in different applications, the freshness and sampling rate of the sent data could be different. It is possible to send different data with different freshnesses and sampling rates. For example, if the processed traffic information is sent every minute based on a sampling rate of 30 seconds, the processed environmental information can be sent every hour with a sampling rate of 10 minutes.

Sensors 13 can be added to and/or removed from the traffic-monitoring device 10 based on location and/or customer requirements. Each sensor 13 will typically have its own protocol or interface so that the traffic-monitoring device 10 will need to be updated with a sensor driver when a new sensor is added. Because the traffic-monitoring device 10 is wireless, it is possible to install the sensor driver over the air. Alternatively, the added sensor can include a dongle, and the dongle contains the information, such as the sensor driver, to be installed when the new sensor is added to the traffic-monitoring device 10.

The sensors 13 can be low-power devices that can be put into a sleep mode when not in use.

Figure 2:
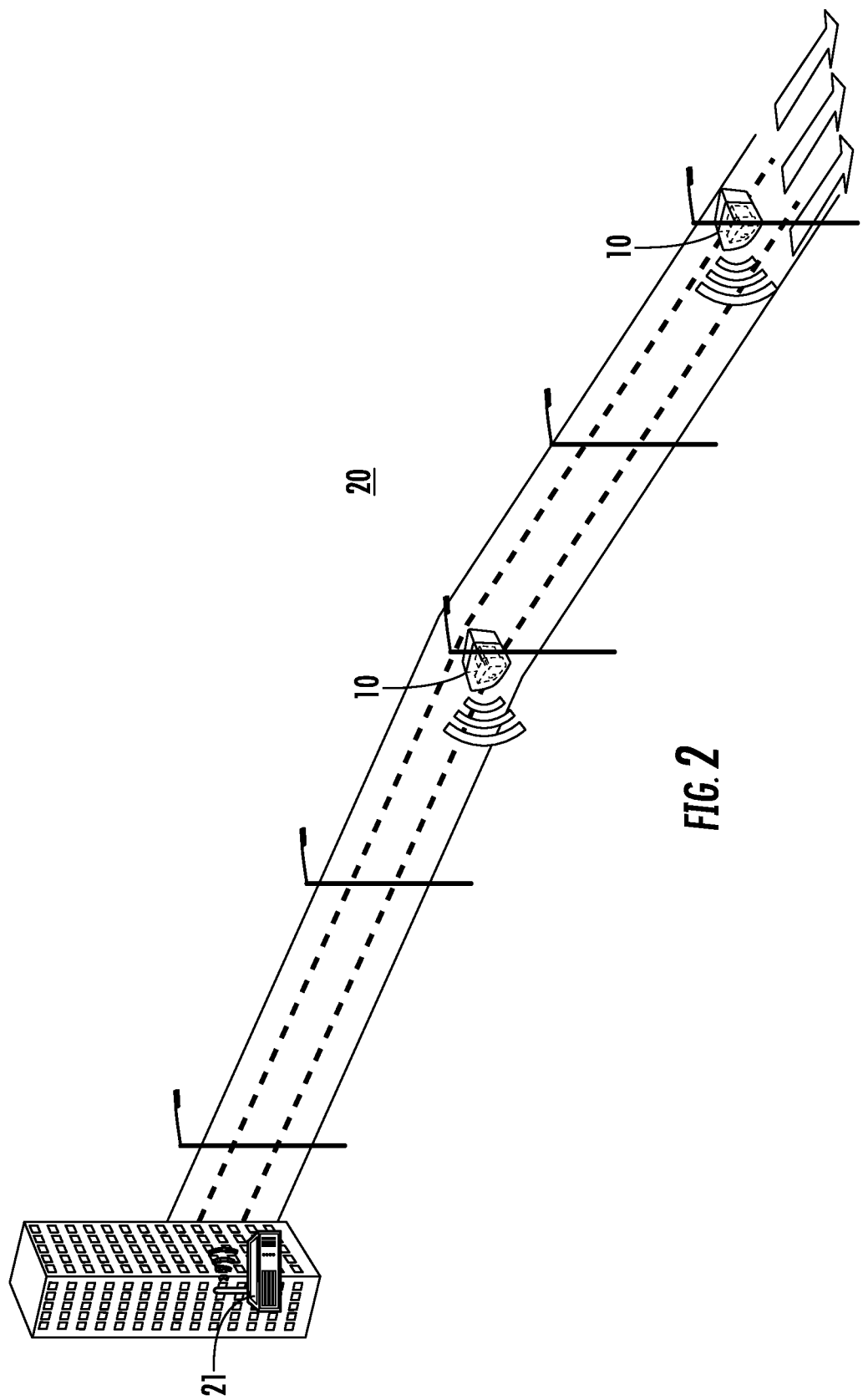
FIG. 2 shows a traffic monitoring system according to a preferred embodiment of the present invention.

FIG. 2 shows a traffic-monitoring system. In FIG. 2, only two traffic-monitoring devices 10 and one gateway 21 are shown in FIG. 2, but any number of traffic-monitoring devices 10 or gateways 21 can be used. The maximum distance between the two traffic-monitoring devices 10 can be about 200 m, but could be different if different radios and/or protocols were used. At least the closest traffic-monitoring device 10 is connected to a gateway 21. But the gateway 21 could be connected to more than one traffic-monitoring device 10. For example, the gateway 21 could be located at the intersection of two roads and could be connected to the closest traffic-monitoring device 10 on each of the roads. For redundancy, gateways 21 could be placed at opposite ends of a road so that if one gateway 21 is malfunctioning, data can still be collected by the other gateway 21.

Figure 3:
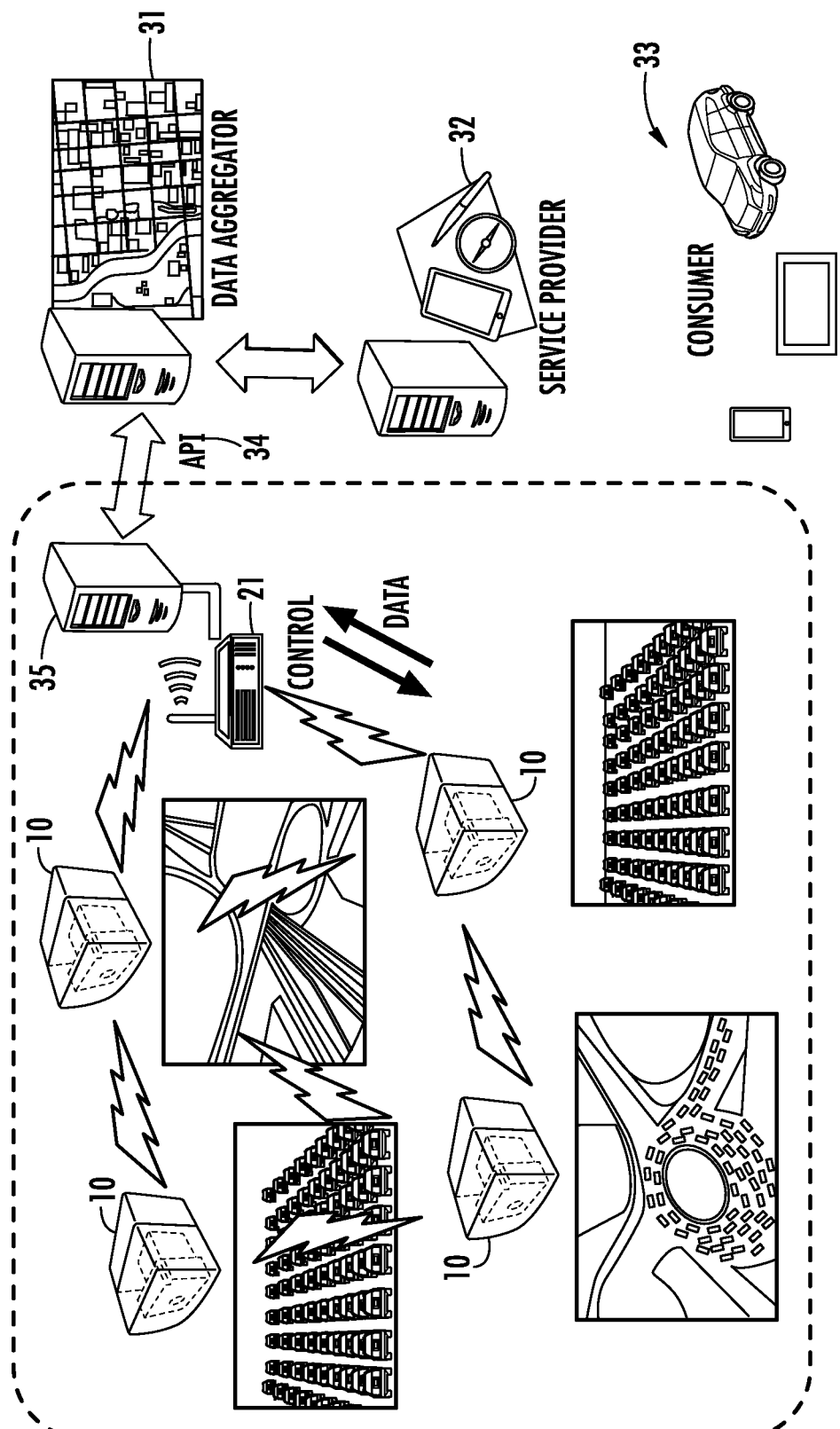
FIGS. 3-5 show various information and data flow diagrams according to preferred embodiments of the present invention.
Figure 4:
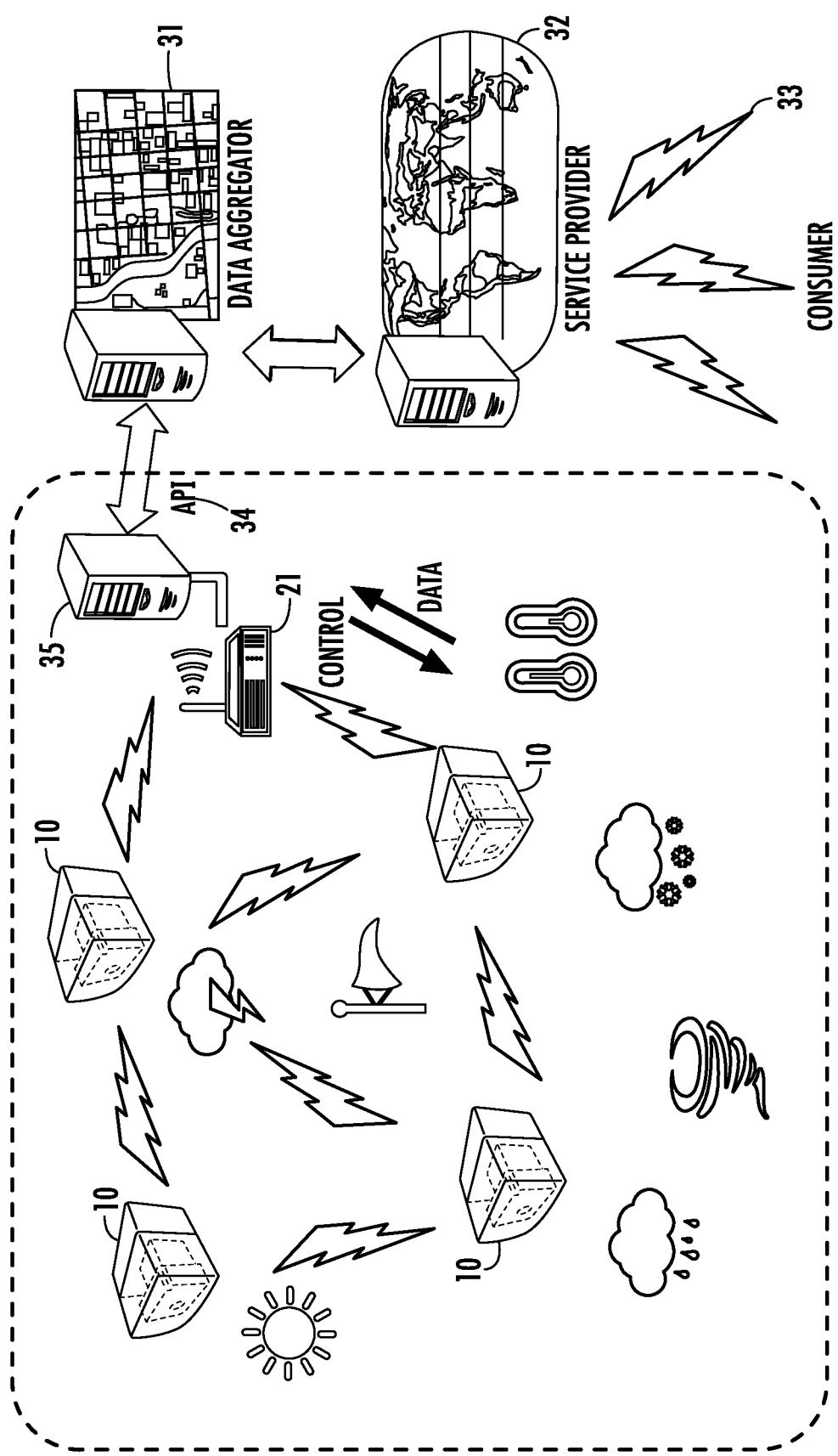

The distance between the gateway 21 and the closest traffic-monitoring device 10 can be about 300 m, but would be different if different radios and/or protocols were used. In FIG. 2, the closer traffic-monitoring device 10 communicates directly to the gateway 21, and the farther traffic-monitoring device 10 can communicate with the gateway 21 through the closer traffic-monitoring device 10. Because the gateway 21 does not monitor traffic, the gateway 21 can be located away from road 22 so that the gateway 21 can receive AC power, e.g., 100 V-240 V AC, 1 amp max, and can be connected to an Ethernet network so that the gateway 21 can send data to a server 35, as shown in FIGS. 3 and 4. The gateway 21 can include a radio that transmits and receives data to and from the traffic-monitoring device 10. The traffic-monitoring devices 10 and the gateways 21 can be arranged in a mesh network, for example.

Figure 6:
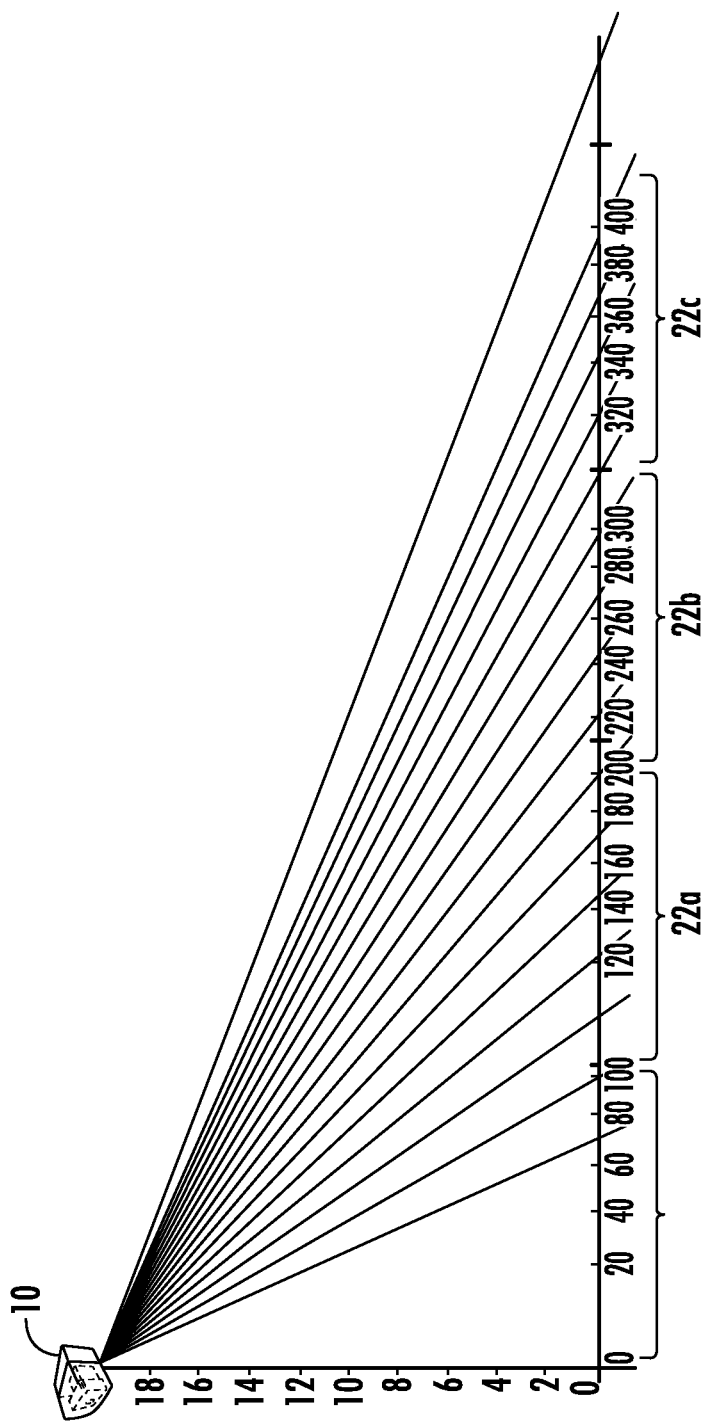
FIG. 6 shows a traffic-monitoring device of FIG. 1 monitoring a road with three lanes.

As shown in FIG. 6, the traffic-monitoring device 10 detects when objects pass through a lane 22a, 22b, 22c. Each lane 22a, 22b, 22c can be subdivided into lane segments. When lane segments are used, the traffic-monitoring device 10 independently monitors each lane segment and determines which lane the object is passing through by determining the peak or centroid lane segment through which the object passed. Lane segments can be used to determine when an object is occupying more than one lane, which can occur, for example, when a car changes lanes.

FIG. 3 shows how the traffic-monitoring system 20 can collect and process traffic data. This processed traffic data is collected by a server 35 connected to the gateway 21. The server 35 then sends the processed traffic data through an application programming interface (API) 34 to a data aggregator 31, then to a service provider 32, and then ultimately to the consumer 33. Similarly, FIG. 4 shows how the traffic-monitoring system 20 can collect and process environmental data. This processed environmental data is collected by the server 35 connected to the gateway 21. The server 35 can then send the processed environmental data through an API 34 to a data aggregator 31, then to a service provider 32, and then ultimately to the consumer 33. In FIGS. 2 and 3, a single gateway 21 is connected to the server 35. But it is possible that more than one gateway 21 is connected to the server 35. It is also possible to use more than one server. For example, a traffic-monitoring system could include a first gateway connected with four traffic-monitoring devices and a second gateway connected with six traffic-monitoring devices. A server can collect data from the first and second gateways for all ten traffic-monitoring devices. This collected data is then sent to a data aggregator, which can be connected to other servers that similarly send collected data from other traffic-monitoring devices.

Figure 5:
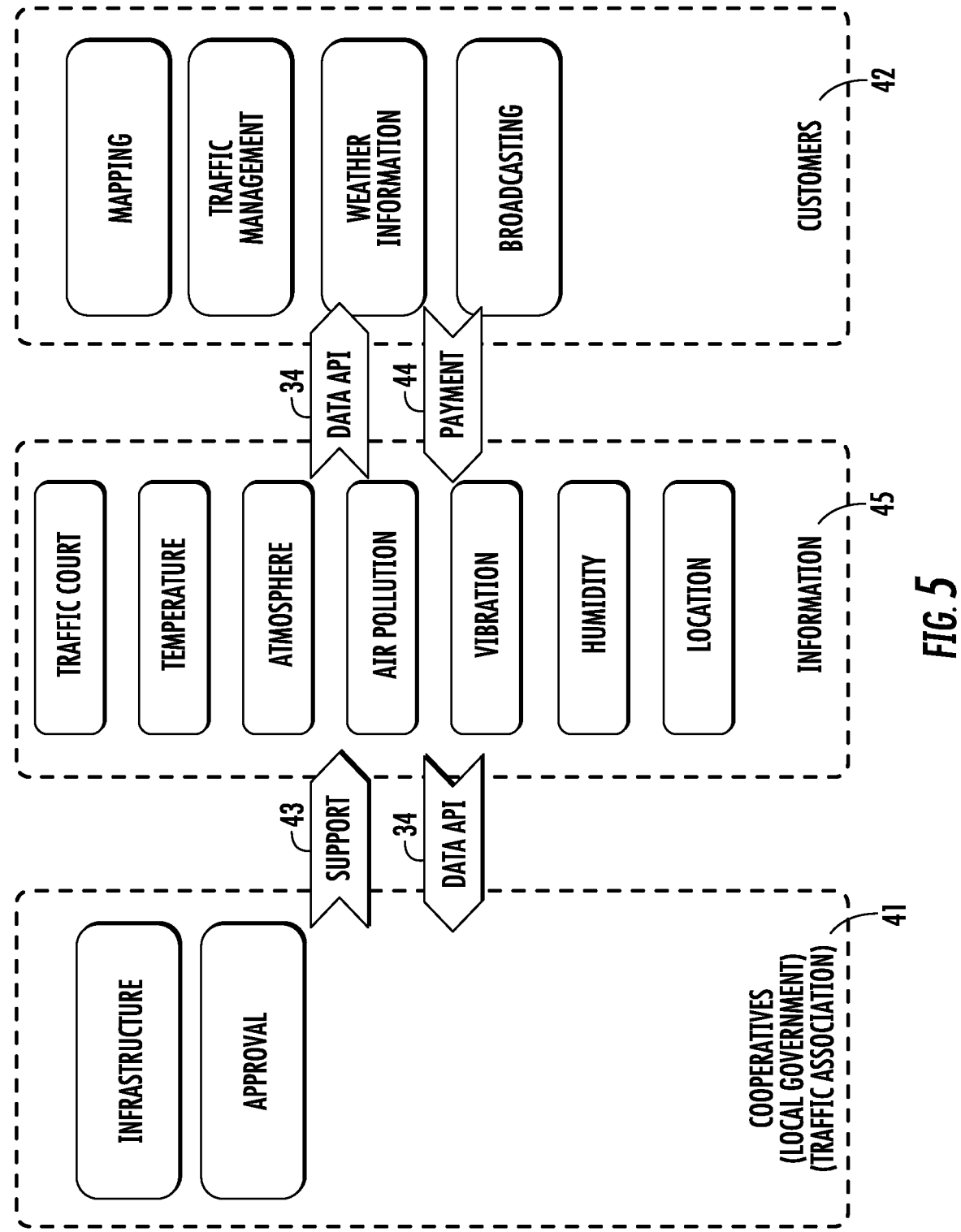

FIG. 5 shows possible consumers of the information 45 generated by the traffic-monitoring systems 20 according to preferred embodiments of the present invention. Both cooperatives 41 (such as local governments and traffic associations) and customers 42 can receive the information 45 from the traffic-monitoring systems 20 through an API 34. As shown in FIG. 5, the information 45 from the traffic-monitoring system 20 can include traffic and/or environmental information. For example, the cooperatives 41 can use the information 45 to help improve the infrastructure and/or make approval decisions. The cooperative 41 can provide support 43 in maintaining. The customers 42 can use the information 45 in any of one or more of mapping, traffic management, weather information, and broadcasting. The customers 42 can send payments 36 in exchange for receiving the information 45.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:
1. A traffic-monitoring system comprising:
a gateway that includes a gateway radio and that is connected to a server; and
traffic-monitoring devices arranged along a road, each of the traffic-monitoring devices including:
a housing;
a microcontroller that is located within the housing;
at least one sensor that is located within the housing, that is connected to the microcontroller, and that collects traffic data; and
a monitor radio that sends data to the gateway or an adjacent traffic-monitoring device;
wherein the microcontroller processes data collected by the at least one sensor to reduce an amount of data to be sent to the gateway or the adjacent traffic-monitoring device and sends processed data to the gateway or the adjacent traffic-monitoring device in real time or near real time using the monitor radio;

a lane of the road is divided into lane segments;

the traffic data includes data that is related to objects detected in each of the lane segments; and wherein the at least one sensor collects environmental data; and the microcontroller samples the environmental data at a different rate than the traffic data and sends processed environmental data at different intervals than processed traffic data.

2. The traffic-monitoring system of claim 1, wherein the microcontroller determines which lane the objects pass through by determining a peak or centroid lane segment through which the objects pass.

3. The traffic-monitoring system of claim 1, wherein the at least one sensor includes a camera and an active IR device.

4. The traffic-monitoring system of claim 1, wherein each of the traffic-monitoring devices includes a battery.

5. The traffic-monitoring system of claim 4, wherein the battery includes a solar battery.

6. The traffic-monitoring system of claim 5, wherein each of the traffic-monitoring devices includes a solar panel that charges the battery.

7. The traffic-monitoring system of claim 4, wherein the battery includes a Li-ion battery.

8. The traffic-monitoring system of claim 1, wherein the processed data includes one or more of a number of vehicles detected, a speed of each of the vehicles detected, a type of each of the vehicles detected, a direction of traffic flow, a presence of congestion, and an occurrence of an accident.

9. The traffic-monitoring system of claim 1, wherein the traffic data is sampled and sent periodically.

10. The traffic-monitoring system of claim 1, wherein:
the traffic data is sampled every 30 seconds and is sent every minute.

11. The traffic-monitoring system of claim 1, wherein the gateway sends data to at least one of the traffic-monitoring devices using the gateway radio.

12. A traffic-monitoring network comprising:
the traffic-monitoring system of claim 1; and
a data aggregator; wherein
the gateway sends data to the data aggregator via the server.

13. The traffic-monitoring network of claim 12, wherein the traffic-monitoring network sends aggregated data to consumers via a service provider.

14. A traffic-monitoring system comprising:
a gateway that includes a gateway radio and that is connected to a server; and
traffic-monitoring devices arranged along a road, each of the traffic-monitoring devices including:
a housing;
a microcontroller that is located within the housing;
at least one sensor that is located within the housing, that is connected to the microcontroller, and that collects traffic data and environmental data; and
a monitor radio that sends data to the gateway or an adjacent traffic-monitoring device; wherein
the microcontroller processes data collected by the at least one sensor to reduce an amount of data to be sent to the gateway or the adjacent traffic-monitoring device and sends processed data to the gateway or the adjacent traffic-monitoring device in real time or near real time using the monitor radio, and
the microcontroller samples the environmental data at a different rate than the traffic data and sends processed environmental data at different intervals than processed traffic data.

15. The traffic-monitoring system of claim 14, wherein the processed data includes one or more of a number of vehicles detected, a speed of each of the vehicles detected, a type of each of the vehicles detected, a direction of traffic flow, a presence of congestion, and an occurrence of an accident.

16. A traffic-monitoring network comprising:
the traffic-monitoring system of claim 14; and
a data aggregator; wherein
the gateway sends data to the data aggregator via the server.

* * * * *